United States Patent [19]
Okita et al.

[11] Patent Number: 4,664,734
[45] Date of Patent: May 12, 1987

[54] PROCESS FOR PRODUCING A MAGNETIC RECORDING MEDIUM

[75] Inventors: Tsutomu Okita; Sugihiko Tada, both of Kanagawa, Japan

[73] Assignee: Fuji Photo Film Co., Ltd., Kanagawa, Japan

[21] Appl. No.: 823,871

[22] Filed: Jan. 29, 1986

[30] Foreign Application Priority Data

Jan. 29, 1985 [JP] Japan .................................. 60-13449
Jan. 29, 1985 [JP] Japan .................................. 60-13450

[51] Int. Cl.$^4$ ............................................ H01F 10/02
[52] U.S. Cl. ................................... 156/231; 156/236; 156/238; 156/272.4; 156/273.3; 156/273.9; 156/275.5; 427/35; 427/36; 427/44; 427/54.1; 427/128; 427/130
[58] Field of Search .............................. 427/127-132, 427/54.1, 36, 44, 35; 156/231, 236, 238, 272.4, 273.3, 273.9, 275.5

[56] References Cited

U.S. PATENT DOCUMENTS

| | | |
|---|---|---|
| 3,793,066 | 2/1974 | Frenken et al. ...................... 427/128 |
| 4,273,603 | 6/1981 | Peronnet et al. ............... 427/130 X |
| 4,312,898 | 1/1982 | McDaniel ........................... 427/130 |
| 4,495,241 | 1/1985 | Iijima ................................. 427/130 |
| 4,499,121 | 2/1985 | Yamaguchi et al. ................ 427/130 |

*Primary Examiner*—Bernard D. Pianalto
*Attorney, Agent, or Firm*—Sughrue, Mion, Zinn, Macpeak & Seas

[57] ABSTRACT

A process for producing a magnetic recording medium is disclosed. The process comprises coating a magnetic coating composition comprising a ferromagnetic powder, a binder, and an organic solvent on either a non-magnetic support or a roller or band having a mirror surface to form a magnetic layer on the non-magnetic support or the roller or band, respectively, drying the magnetic layer so as to have a solvent content of from 0.05 to 10% by weight, contacting the magnetic layer on the support or the roller or band with a roller or band having a mirror surface or a non-magnetic support, respectively, and separating the magnetic layer from the roller or band. The resulting magnetic recording medium has smooth surface, high electromagnetic properties, and good durability.

26 Claims, 2 Drawing Figures

PROCESS FOR PRODUCING A MAGNETIC RECORDING MEDIUM

FIELD OF THE INVENTION

This invention relates to a magnetic recording medium, such as video tapes, audio tapes, computer tapes, etc.

BACKGROUND OF THE INVENTION

A conventional process for producing a magnetic recording medium that is commonly employed in the art comprises coating a magnetic coating composition to a non-magnetic support, drying the coating, smoothing the coated layer by the use of a calendar composed of a mirror-finished metal roller and an elastic roller, and then crosslinking a binder by, for example, heating. However, this conventional process involves a smoothing step using several rollers at strictly controlled conditions with respect to temperature and pressure apart from coating and drying steps, and therefore entails high costs. Further, magnetic recording media have recently been demanded to have high electromagnetic properties and running durability, but these requirements are not fully satisfied by the conventional process.

In an attempt to eliminate the above-described problems, it has been described to use a radiation-polymerizable compound as a binder in place of a thermosetting compound, e.g., a polyisocyanate compound, which can be cured upon irradiation as described, e.g., in Japanese Patent Application (OPI) Nos. 25231/81, 122802/81 and 124119/81 (the term "OPI" used herein refers to an "unexamined published application"). However, the use of only a radiation-polymerizable compound as a binder failed to solve the above-described problems.

On the other hand, a technique of transfer coating has been described by Dr. Nablo in *Symposium on Magnetic Media Manufacturing Methods* (May, 1983, Honolulu) (Paper No. B-4), aiming at improvement of surface smoothness of a coated layer. This technique, however, could not succeed to increase a concentration of ferromagnetic fine powders, i.e., the so-called pigment/vehicle ratio, and is, therefore, not practicable for the production of magnetic recording media. In other words, the process described by Dr. Nablo is not capable of ensuring sufficient electromagnetic properties and cannot be industrially employed as a process for producing a magnetic recording medium.

SUMMARY OF THE INVENTION

Accordingly, one object of this invention is to provide a process for producing a magnetic recording medium having high electromagnetic properties.

Another object of this invention is to provide a process for producing a magnetic recording medium having good running durability.

A further object of this invention is to provide a process for producing a magnetic recording medium at a low cost.

A still further object of this invention is to provide a process for producing a magnetic recording medium having a smooth magnetic surface.

As a result of extensive investigations to overcome the above-described problems associated with the conventional process, it has now been found that the above objects can be accomplished by a process comprising coating a magnetic coating composition comprising a ferromagnetic powder, a binder, and an organic solvent on either a non-magnetic support or a roller or band having a mirror surface, to provide a magnetic layer on the non-magnetic support or the roller or band, respectively, drying the magnetic layer so as to have a solvent content of from 0.05 to 10% by weight based on the total weight of the magnetic layer, contacting the magnetic layer formed on the support with a roller or band having a mirror surface in a first embodiment, or contacting the magnetic layer formed on the roller or band having a mirror surface with a non-magnetic support in a second embodiment, and separating the magnetic layer from the roller or band.

In preferred embodiments of the present invention, the binder is a radiation-polymerizable compound and the magnetic layer containing the radiation-polymerizable compound is irradiated with radiation while being interposed between the roller or band and the non-magnetic support or after being separated from the roller or band.

Figure 1:
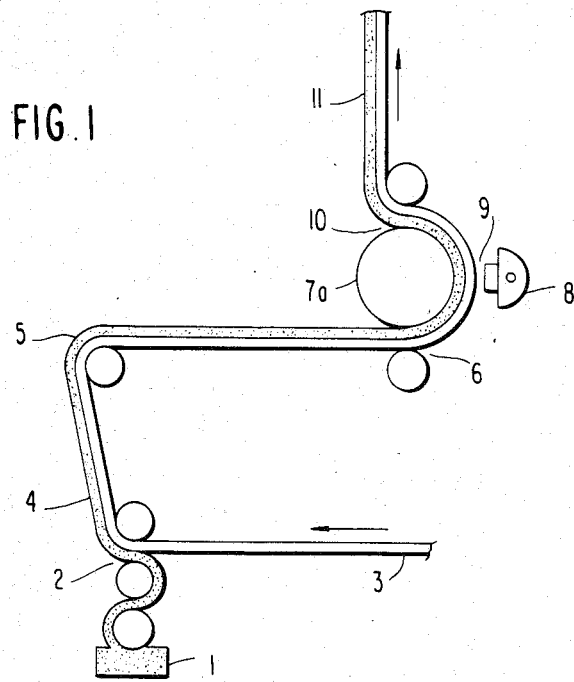
FIG. 1 is a schematic view of an example of a first embodiment according to the present invention.

In these figures, the numerals indicate the following parts:

1 is a magnetic coating composition,
2 is a coating zone,
3 is a non-magnetic support,
4 is a magnetic layer,
5 is a first drying zone,
6 is a nipping zone,
7a is a roller having a mirror surface,
7b is a band having a mirror surface,
8 is a radiation generator,
9 is an irradiation zone,
10 is a separation zone, and
11 is a second drying zone.

DETAILED DESCRIPTION OF THE INVENTION

The ferromagnetic powder which can be used in the present invention includes ferromagnetic iron oxide fine powders, Co-doped ferromagnetic iron oxide fine powders, ferromagnetic chromium dioxide fine powders, ferromagnetic alloy powders, barium ferrite, etc. Ferromagnetic iron oxide or chromium dioxide fine powders generally have an acicular ratio of from about 2/1 to about 20/1, preferably 5/1 or more, and has an average length of from about 0.2 $\mu$m to about 2.0 $\mu$m. The ferromagnetic alloy fine powders generally have a metal content of 80% by weight or more, with not less than 80% by weight of the metal content being a ferromagnetic metal, e.g., Fe, Co, Ni, Fe-Co, Fe-Ni, Co-Ni, or Fe-Co-Ni, and have a longest dimension of about 1.0 $\mu$m or less.

The binder which can be used in the present invention includes thermoplastic resins, such as vinyl chloride-vinyl acetate type copolymers, e.g., a vinyl chloride-vinyl acetate copolymer, a vinyl chloride-vinyl acetate-maleic acid copolymer, a vinyl chloride-vinyl acetate-acrylic acid copolymer, a vinyl chloride-vinyl propionate-maleic acid copolymer, a vinyl chloride-vinyl propionate-butenoic acid copolymer, a vinylidene chloride-vinyl acetate-maleic acid copolymer, a vinyl chloride-vinyl acetate-vinyl alcohol copolymer a vinyl chloride-vinyl propionate-vinyl alcohol copolymer, etc.; cellulose resins, e.g., cellulose nitrate, cellulose acetate propionate, cellulose diacetate, cellulose propionate, etc.; acetal resins, e.g., polyvinyl formal, polyvinyl acetal, polyvinyl butyral, etc.; phenoxy resins, urethane resins, a vinyl chloride-vinylidene chloride copolymer, a vinyl chloride-acrylonitrile copolymer, an acrylic ester-acrylonitrile copolymer, a vinylidene chloride-acrylonitrile copolymer, a butadiene-acrylonitrile copolymer, polyester resins, polyisocyanate compounds, e.g., 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3-dimethylphenylene diisocianate, 4,4-diphenylmethane diisocyanate, 3,3-dimethyl-4,4-diphenylmethane diisocyanate, hexamethylene diisocyanate, isophorone diisocyanate, dicyclohexylmethane diisocyanate, and an adduct of trimethylolpropane and three moles of tolylene diisocyanate, etc., and, as radiation-polymerizable compounds, acrylate oligomers and methacrylate oligomers (hereinafter the terminology "acrylate" collectively means both acrylate and methacrylate) including urethane acrylates having a molecular weight of from 1,000 to 50,000, preferably from 3,000 to 30,000 and more preferably from 5,000 to 15,000 (e.g., polyester type urethane acrylate, polyether type urethane acrylate, polyester ether type urethane acrylate, etc.), epoxy acrylate, polyester acrylate, polyether acrylate, and the like. Specific examples of such binders are described in A. Vracken, *Fatipec Congress*, Vol. 11, p. 19 (1972), with an example being shown below.

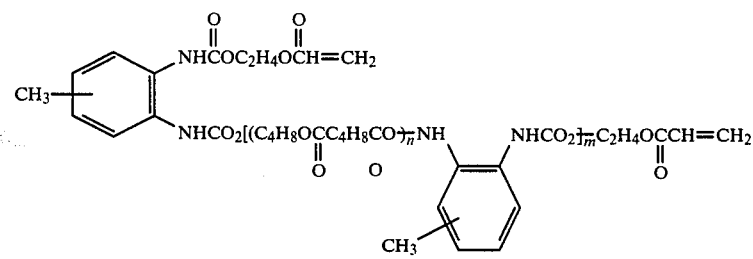

Additional examples of the radiation-polymerizable compounds useful as a binder are compounds having at least one carbon-carbon unsaturated bond per molecule, such as polyfunctional acrylate compounds (i.e., having two or more carbon-carbon unsaturated bonds as the functional groups, preferably two or more acryloyl or methacryloyl groups) having a molecular weight of less than 1,000, preferably less than 800, e.g., ethylene glycol diacrylate, diethylene glycol diacrylate, triethylene glycol diacrylate, tetraethylene glycol diacrylate, trimethylolpropane triacrylate, pentaerythritol tetraacrylate, dipentaerythritol pentaacrylate, dipentaerythritol hexaacrylate, dipentaerythritol heptaacrylate, tris($\beta$-acryloyloxyethyl)isocyanurate, bis($\beta$-acryloyloxyethyl)isocyanurate, bis-2-acryloyloxyethylhydroxyethylisocyanurate, a reaction product of a polyisocyanate as described above and a hydroxyacrylate compound (e.g., $\beta$-hydroxyethylacrylate, $\beta$-hydroxypropyl acrylate, etc.), acrylate esters of other polyols, etc; acrylic acid, methacrylic acid, methyl acrylate and other analogous acrylic alkyl esters, methacrylic alkyl esters, acrylamides, methacrylamides, allyl compounds, vinyl ethers, vinyl esters (e.g., vinyl acetate, vinyl propionate, etc.), vinyl group-containing heterocyclic compounds, N-vinyl compound, styrenes (e.g, styrene, $\alpha$-methylstyrene, etc.), acrylonitrile, crotonic acids, itaconic acids, olefins, etc.

These binders can be used alone or in combinations of two or more thereof. It is also possible to use a thermosetting resin in combination with these radiation-polymerizable compounds.

Preferred among these binders are a three-component-system comprising a cellulose resin or a vinyl chloride-vinyl acetate type copolymer, a urethane resin, and a polyisocyanate, and a three-component-system comprising a cellulose resin or a vinyl chloride-vinyl acetate type copolymer, a urethane acrylate, and a polyfunctional acrylate compound, the latter three-component-system being more preferred. In this case, a preferred weight ratio of cellulose resin or vinyl chloride-vinyl acetate type copolymer to urethane acrylate is from 4/1 to 1/2, and a preferred weight ratio of the sum of cellulose resin or vinyl chloride-vinyl acetate type copolymer and urethane acrylate to polyfunctional acrylate is from 4/1 to 1/1.

In the case of using, as a binder, a three-component-system comprising a cellulose resin or a vinyl chloride-vinyl acetate type copolymer, a urethane resin and a polyisocyanate, i.e., a binder containing no radiation-polymerizable compound, it is preferable that the magnetic layer is heated to a temperature of from 40° to 100° C. for curing after it is separated apart from a roller or band having a mirror surface. In the case of using a binder containing a radiation-polymerizable compound, it is preferable to subject the magnetic layer to irradiation while being sandwiched between a roller or band having a mirror surface and a non-magnetic support or after being separated from the roller or band. In particular, it is most preferred and easiest that radiation is applied to the magnetic layer while being sandwiched between the roller or band and the non-magnetic support and then the magnetic layer is separated from the roller or band. In the case where the magnetic layer is irradiated while being sandwiched, irradiation is effected from the side of the non-magnetic support. On the other hand, when it is irradiated after separation from the roller or band, irradiation may also be effected from the side of the magnetic layer.

The solvent to be used for the magnetic coating can be selected from ketones, e.g., acetone, methyl ethyl ketone, methyl isobutyl ketone, cyclohexanone, etc., esters, e.g., methyl acetate, ethyl acetate, butyl acetate, ethyl lactate, glycol acetate monoethyl ether, etc.; glycol ethers, e.g., diethyl ester, glycol dimethyl ether, glycol monoethyl ether, dioxane, etc.; aromatic hydrocarbons, e.g., benzene, toluene, xylene, etc.; chlorinated hydrocarbons, e.g., methylene chloride, ethylene chloride, carbon tetrachloride, chloroform, ethylene chlorohydrin, dichlorobenzene, etc.; tetrahydrofuran, and the like.

A weight ratio of ferromagnetic powder to binder in the magnetic coating composition is generally from 2/1 bo 6/1, preferably from 3/1 to 5/1, and a weight ratio of solvent to binder in the magnetic coating composition is generally from 6/1 to 15/1, preferably from 7/1 to 10/1.

Coating of the magnetic coating composition on the non-magnetic support or the roller or band having a mirror surface can be carried out by various known methods, such as air doctor coating, blade coating, air knife coating, squeeze coating, impregnation coating, reverse-roll coating, transfer roller coating, gravure coating, kiss-roll coating, cast coating, spray coating, spin coating, and others. Such coating methods are described in detail, e.g., in *Coating Engineering*, pp. 253-277, Asakura Shoten (1971).

Materials for the non-magnetic support on which the magnetic coating composition is to be coated in the first embodiment or to which a magnetic layer is to be transferred include polyesters, such as polyethylene terephthalate, polyethylene-2,6-naphthalate, etc.; polyolefins, e.g., polyethylene, polypropylene, etc.; cellulose derivatives, e.g., cellulose triacetate, cellulose diacetate, cellulose acetate butyrate, cellulose acetate propionate, etc.; plastics, such as vinyl resins, e.g., polyvinyl chloride, polyvinylidene chloride, etc., polycarbonate, polyimide, polyamideimide, etc.; non-magnetic metals, such as aluminum, copper, tin, zinc, and non-magnetic alloys containing these metals; and plastic supports having provided thereon a thin film of these non-magnetic metals by vacuum deposition or the like. The non-magnetic support used in the present invention generally has a surface roughness (Ra) of from 0.05 to 0.2 μm. The support is preferably subjected to a subbing treatment or a physical treatment, such as corona discharge, prior to the application of a magnetic layer. Further, the support may have provided thereon a backcoat on the opposite side from the magnetic layer, either before or after the coating or transfer of the magnetic layer.

Materials for the roller or band having mirror surface used in the present invention are not particularly limited, and chromium-plated stainless steel is preferably used for the purpose. The roller or band generally has a surface roughness of not more than 0.02 μm, and preferably not more than 0.015 μm.

Radiation which can be used in the present invention includes ultraviolet rays, electron rays, γ-rays, β-rays, X-rays and the like, with electron rays being preferred. Electron beam accelerators to be used include a scanning accelerator, a double scanning accelerator, a curtain beam accelerator, and a broad beam curtain accelerator. The accelerating voltage is generally from 100 to 1,000 KV, preferably from 150 to 300 KV, and the absorbed dose is generally from 1.0 to 20 Mrad and preferably from 2 to 10 Mrad. If the accelerating voltage is less than 100 KV, the transmitted amount of energy is insufficient, and if it exceeds 1,000 KV, the energy used for polymerization is reduced, making the process uneconomical. If the absorbed dose is less than 1.0 Mrad, the curing reaction is insufficient for obtaining a magnetic layer having a satisfactory mechanical strength, and if it is more than 20 Mrad, the energy efficiency used for curing is lowered or a radiated object generates heat which results in deformation especially of the non-magnetic support.

Drying after coating of the magnetic coating composition is carried out by hot air until the remaining solvent content is reduced to a range of from 0.05 to 10% by weight, preferably from 0.5 to 8% by weight, and more preferably from 1.5 to 5% by weight.

According to a first embodiment of this invention, the magnetic layer provided on the non-magnetic support is brought into contact with a roller or band having a mirror surface at the time when the remaining solvent content is reduced to the above-recited range. In a second embodiment of this invention, the magnetic layer provided on the mirror roller or band is contacted with a non-magnetic support when the remaining solvent content falls within the above-recited range. The contact pressure is generally from 1 to 50 kg/cm, and preferably from 5 to 30 kg/cm. After a contact time of from about 0.1 to 5 seconds, the magnetic layer is separated from the roller or band. If necessary, the mirror roller or band may be heated to a temperature of from about 40° to 100° C. In the case of using radiation for curing, the magnetic layer is preferably irradiated while being interposed between the mirror roller or band and the non-magnetic support in view of easiness in separation and maintenance of surface smoothness of the magnetic layer. It is also possible to provide an additional drying zone after the separation. If desired, the magnetic layer may also be subjected to thermal curing or radiation curing after drying in the second drying zone.

Further, if necessary, the magnetic layer coated on the nonmagnetic support or the mirror roller or band can be easily oriented in a magnetic field. The orientation can be effected by the use of a solenoid, an electromagnet, a permanent magnet, etc.

The magnetic coating composition according to the present invention may contain additives, such as lubricants, abrasives, dispersing agents, antistatic agents, rust-inhibitors, and the like. Examples of lubricants are saturated or unsaturated higher fatty acids, fatty acid esters, higher fatty acid amides, higher alcohols, silicone oils, mineral oils, edible oils, and fluorine-containing compounds. These additives may be added to the coating composition during the preparation thereof or coated or sprayed onto the magnetic layer with or without an organic solvent after the magnetic layer is separated from the roller or band.

The present invention is now illustrated in greater detail with reference to the following examples and comparative examples, but it should be understood that the present invention is not limited thereto. In these examples, all parts and ratios are by weight unless otherwise indicated.

EXAMPLES 1 AND 2 and COMPARATIVE EXAMPLES 1 and 2

| Binder Composition: | |
|---|---|
| Fe fine powder (Hc = 1500 Oe; 0.3 × 0.04 μm) | 400 parts |
| Nitrocellulose (RS1/2H, produced by Daicel Chemical Industries, Ltd.) | 40 parts |
| Urethane acrylate (urethane acrylate oligomer having an acryloyl terminal obtained by reacting an OH-terminated urethane prepolymer composed of sebacic acid, butanediol and diphenylmethane diisocyanate, with tolylene diisocyanate and 2-hydroxyethyl acrylate; molecular weight: 25,000) | 40 parts |
| Bis-2-acryloyloxyethyl-hydroxyethyl isocyanurate | 20 parts |
| Lecithin | 4 parts |

-continued

| | |
|---|---|
| Stearic acid | 4 parts |
| Butyl stearate | 4 parts |
| Carbon black | 10 parts |
| Methyl ethyl ketone/toluene (weight ratio: 5/5) | 800 parts |

The above components were kneaded in a ball mill for 50 hours to prepare a magnetic coating composition, which was then coated on a 10 μm-thick polyethylene terephthalate film 3 as illustrated in FIG. 1 to a thickness of 20 μm. The coated layer 4 was subjected to orientation with a cobalt magnet, dried in a first drying zone 5 at 100° C., contacted with mirror roller 7a under a nip pressure of 20 kg/cm. The magnetic layer while being sandwiched between the support and the mirror roller was irradiated with 10 Mrad (exposed dose) of an electron beam with an accelerating voltage of 165 KV. The magnetic layer was then peeled off from the mirror roller, followed by drying in second drying zone 11. The residual solvent content of the magnetic layer at nipping zone 6 was varied as shown in Table 1 below by controlling the speed of the nip rolls and the support.

TABLE 1

| Example No. | Sample No. | Residual Solvent Content (wt %) |
|---|---|---|
| Example 1 | 1 | 1.6 |
| Example 2 | 2 | 7.0 |
| Comparative Example 1 | 3 | 0.04 |
| Comparative Example 2 | 4 | 11.0 |

EXAMPLE 3

Sample 5 was prepared in the same manner as described in Example 1, except that irradiation with an electron beam was not carried out in irradiation zone 9 of FIG. 1, but rather was conducted immediately after the peeling of the magnetic layer from the mirror roller.

COMPARATIVE EXAMPLE 3

The same magnetic coating composition as prepared in Example 1 was coated on a 10 μm-thick polyethylene terephthalate film to form a magnetic layer. The magnetic layer was oriented in a magnetic field using a cobalt magnet, dried at 100° C., subjected to smoothing treatment using calendar rollers at 60° C., and irradiated with 10 Mrad (absorbed dose) of an electron beam with an accelerating voltage of 165 KV. The magnetic layer after drying and before smoothing had a residual solvent content of 0.01% by weight or less. The resulting recording medium was designated as Sample 6.

In the preparation of Samples 1 to 6, the residual solvent content (wt%) based on the magnetic layer was measured by gas chromatography.

Each of the resulting recording media (Samples 1 to 6) was visually observed for the appearance of the magnetic layer after peeling from the mirror roller. Sample 4 (Comparative Example 2) did not provide a visually good recording medium due to partial adhesion of the magnetic layer to the mirror roller.

Then, each of Samples 1, 2, 3, 5, and 6 was evaluated for surface roughness of the magnetic layer, video S/N ratio, and durability in a still mode in accordance with the following test methods:

Surface Roughness of Magnetic Layer

Average center-line roughness as defined in JIS B0601, Item 5 was measured by the use of a surface roughness meter produced by Tokyo Seimitsu K.K. (cut-off was 0.25 mm).

Video S/N Ratio

The magnetic recording medium was run on a video tape recorder ("NV8200", manufactured by Matsushita Electric Industries Co., Ltd.) and 50% set-up gray signals were recorded on the recording medium. The S/N ratio was determined using an S/N meter, model 925C manufactured by Sibasoku Co., Ltd. and was expressed as a relative value by taking the S/N ratio of Sample 1 to 0 dB.

Durability in a Still Mode

The recoridng medium was run on a VHS video tape recorder ("NV8200", manufactured by Matsushita Electric Industries Co., Ltd.), and predetermined video signals were recorded thereon. The time until reproduced still images lost their clearness was determined.

The results obtained are shown in Table 2.

TABLE 2

| Sample No. | Appearance After Peeling | Surface Roughness (μm) | Video S/N (dB) | Durability in Still Mode (min) |
|---|---|---|---|---|
| 1 | good | 0.005 | 0 | 60 or more |
| 2 | good | 0.008 | −0.5 | 60 or more |
| 3 | good | 0.122 | −10.5 | 1 or less |
| 5 | good | 0.006 | −0.1 | 60 or more |
| 6 | — | 0.022 | −3.0 | 60 or less |

It can be seen from Table 2 that the magnetic recording media according to the present invention (Samples 1, 2 and 5) have a smooth surface, good electromagnetic properties, and good durability.

EXAMPLES 4 TO 6 and COMPARATIVE EXAMPLES 4 TO 5

| Binder Composition: | |
|---|---|
| γ-Fe₂O₃ (Hc: 650 Oe; 0.5 × 0.05 μm) | 400 parts |
| Vinyl chloride-vinyl acetate-maleic acid copolymer (92/4/4; number average molecular weight: ca. 50,000) | 40 parts |
| Urethane resin (a condensation product between adipic acid, butanediol and tolylene diisocyanate; number average molecular weight: ca. 30,000) | 30 parts |
| Adduct of trimethylopropane and tolylene diisocyanate (molar ratio: 1/3) | 30 parts |
| Lecithin | 4 parts |
| Stearic acid | 4 parts |
| Butyl stearate | 4 parts |
| Al₂O₃ | 4 parts |
| Carbon black | 10 parts |
| Methyl ethyl ketone | 1000 parts |

Figure 2:
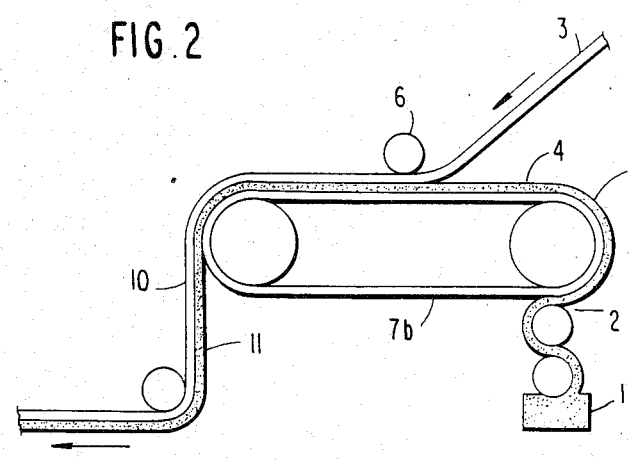
FIG. 2 is a schematic view of an example of a second embodiment according to the present invention.

The above components were kneaded in a ball mill for 50 hours to prepare a magnetic coating composition. The composition was coated on a mirror-finished band 7b of FIG. 2 at a thickness of 30 μm, oriented in a magnetic field using a cobalt magnet, and dried at 100° C. in first drying zone 5. Polyethylene terephthalate film (non-magnetic support) 3 having a thickness of 15 μm was then brought into contact with magnetic layer 4 on band 7b under a nip pressure of 10 kg/cm while controlling the residual solvent content of the magnetic layer at nipping zone 6 as shown in Table 3 below by changing the speeds of band 7b and non-magnetic support 3. Magnetic layer 4 was transferred from mirror band 7b to non-magnetic support 3 at separation zone 10 and heated at 60° C. for 48 hours for curing.

TABLE 3

| Example No. | Sample No. | Residual Solvent Content (wt %) |
|---|---|---|
| Example 4 | 7 | 0.1 |
| Example 5 | 8 | 8.0 |
| Example 6 | 9 | 3.0 |
| Comparative Example 4 | 10 | 0.03 |
| Comparative Example 5 | 11 | 12.0 |

In the preparation of Samples 7 to 11, the residual solvent content (wt%) based on the magnetic layer was measured by gas chromatography.

Each of the resulting recording media (Samples 7 to 11) was visually observed for appearance of the magnetic layer after transfer from the mirror band. Sample 11 did not provide a visually good recording medium due to partial adhesion of the magnetic layer to the mirror band.

Then, each of samples 7 to 10 was evaluated for surface roughness of the magnetic layer, video S/N ratio, and durability in a still mode in the same manner as described above for Example 1. The results obtained are shown in Table 4 below.

TABLE 4

| Sample No. | Appearance After Peeling | Surface Roughness (μm) | Video* S/N (dB) | Durability in Still Mode (min) |
|---|---|---|---|---|
| 7 | good | 0.013 | 0 | 60 or more |
| 8 | good | 0.008 | +1.0 | 60 or more |
| 9 | good | 0.007 | +2.0 | 60 or more |
| 10 | good | 0.210 | −15.0 | 1 or less |

*The S/N ratio of Sample 7 was taken as 0 dB.

It can be seen from the results of Table 4 that the recording media according to the present invention (Samples 7, 8, and 9) have a smooth magnetic layer surface, good electromagnetic properties, and good durability.

EXAMPLES 7 AND 8 AND COMPARATIVE EXAMPLES 6 AND 7

Magnetic tapes (Samples 12 to 15) were prepared in the same procedure as in Example 4 except that the following components were kneaded to prepare a magnetic coating composition and the magnetic recording layer provided on band 7b was irradiated with 10 Mrad (exposed dose) of electron beam with an accelerating voltage of 170 KV for curing just before transfer from band 7b to non-magnetic supprt 3.

| Binder Composition: | |
|---|---|
| Fe—Ni powder (Ni: 5 wt %; Hc: 1500 Oe; 0.3 × 0.04 μm) | 400 parts |
| Vinyl chloride-vinyl acetate-maleic acid copolymer (90/9/1; number average molecular weight: ca. 30,000) | |
| Urethane acrylate ("Aronix M1100", produced by Toagosei Chemical Industry Co., Ltd.) | 40 parts |
| Trimethylolpropane triacrylate | 20 parts |
| Stearic acid | 4 parts |
| Butyl stearate | 4 parts |
| Al₂O₃ | 4 parts |
| Carbon black | 10 parts |
| Methyl ethyl ketone | 400 parts |
| Toluene | 400 parts |

In the preparation of Samples 12 to 15, the residual solvent content (wt%) based on the magnetic layer was measured by gas chromatography.

Each of the resulting recording media (Samples 12 to 15) was visually observed for appearance of the magnetic layer after transfer from the mirror band. Sample 15 did not provide a visually good recording medium due to partial adhesion of the magnetic layer to the mirror band.

Then, each of samples 12 to 14 was evaluated for surface roughness of the magnetic layer, video S/N ratio, and durability in a still mode in the same manner as described above for Example 1. The results obtained are shown in Table 5 below.

TABLE 5

| Example No. | Sample No. | Residual Solvent Content (wt %) | Appearance After Peeling | Surface Roughness (μm) | Video* S/N (dB) | Durability in Still Mode (min) |
|---|---|---|---|---|---|---|
| Example 7 | 12 | 2.2 | good | 0.004 | ±0 | 60 or more |
| Example 8 | 13 | 6.5 | good | 0.007 | −0.5 | 60 or more |
| Comparative Example 6 | 14 | 0.04 | good | 0.110 | −5.0 | 1 or less |
| Comparative Example 7 | 15 | 12.0 | partial adhesion to the Band | ** | ** | ** |

*The S/N ratio of Sample 12 was taken as 0 dB.
**Not measured.

It can be seen from the results of Table 5 that the recording media according to the present invention (Samples 12 and 13) have a smooth magnetic layer surface, good elecromagnetic properties, and good durability.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium, which comprises coating a magnetic coating composition comprising a ferromagnetic powder, a binder, and an organic solvent on a non-magnetic support to form a magnetic layer, drying the magnetic layer so as to have a solvent content of from 0.05 to 10% by weight based on the total weight of the magnetic layer, contacting the magnetic layer with a roller or band having a mirror surface, and peeling the magnetic layer from the roller or band.

2. A process as in claim 1, wherein said binder is a radiation-polymerizable compound and the magnetic layer is irradiated with radiation while being interposed between the roller or band and the non-magnetic support.

3. A process as in claim 1, wherein said binder is a radiation-polymerizable compound and the magnetic layer is irradiated with radiation after being peeled from the roller or band.

4. A process as in claim 2, wherein said binder is a three-component system comprising (1) a vinyl chloride-vinyl acetate type copolymer or a cellulose resin, (2) a urethane acrylate, and (3) a polyfunctional acrylate compound.

5. A process as in claim 3, wherein said binder is a three-component system comprising (1) a vinyl chloride-vinyl acetate type copolymer or a cellulose resin, (2) a urethane acrylate, and (3) a polyfunctional acrylate compound.

6. A process as in claim 4, wherein the weight ratio of cellulose resin or vinyl chloride-vinyl acetate type copolymer to urethane acrylate is from 4/1 to 1/2, and the weight ratio of the sum of cellulose resin or vinyl chloride-vinyl acetate type copolymer and urethane acrylate to polyfunctional acrylate is from 4/1 to 1.1.

7. A process as in claim 5, wherein the weight ratio of cellulose resin or vinyl chloride-vinyl acetate type copolymer to urethane acrylate is from 4/1 to 1/2, and the weight ratio of the sum of cellulose resin or vinyl chloride-vinyl acetate type copolymer and urethane acrylate to polyfuntioncal acrylate is from 4/1 to 1/1.

8. A process as in claim 1, wherein said binder is three-component system comprising (1) a vinyl chloride-vinyl acetate type copolymer or a cellulose resin, (2) a urethane resin, and (3) a polyisocyanate.

9. A process as in claim 8, wherein the magnetic layer is heated to a temperature of from 40 to 100° C. for curing after the magnetic layer is separated from the roller or band having a mirror surface.

10. A process for producing a magnetic recording medium, which comprises coating a magnetic coating composition comprising a ferromagnetic powder, a binder, and an organic solvent on a roller or band having a mirror surface to form a magnetic layer, drying the magnetic layer so as to have a solvent content of from 0.05 to 10% by weight based on the total weight of the magnetic layer, contacting the magnetic layer with a non-magnetic support, and transferring the magentic layer from the roller or band to the non-magnetic support.

11. A process as in claim 10, wherein said binder is a radiation-polymerizable compound and the magnetic layer is irradiated with radiation while being interposed between the roller or band and the non-magnetic support.

12. A process as in claim 10, wherein said binder is a radiation-polymerizable compound and the magnetic layer is irradiated with radiation after being transferred from the roller or band to the non-magnetic support.

13. A process as in claim 11, wherein said binder is a three-component system comprising (1) a vinyl chloride-vinyl acetate type copolymer or a cellulose resin, (2) a urethane acrylate, and (3) a polyfunctional acrylate compound.

14. A process as in claim 12, wherein said binder is a three-component system comprising (1) a vinyl chloride-vinyl acetate type copolymer or a cellulose resin, (2) a urethane acrylate, and (3) a polyfunctional acrylate compound.

15. A process as in claim 13, wherein the weight ratio of cellulose resin or vinyl chloride-vinyl acetate type copolymer to urethane acrylate is from 4/1 to 1/2, and the weight ratio of the sum of cellulose resin or vinyl chloride-vinyl acetate type copolymer and urethane acrylate to polyfuntioncal acrylate is from 4/1 to 1/1.

16. A process as in claim 14, wherein the weight ratio of cellulose resin or vinyl chloride-vinyl acetate type copolymer to urethane acrylate is from 4/1 to 1/2, and the weight ratio of the sum of cellulose resin or vinyl chloride-vinyl acetate type copolymer and urethane acrylate to polyfuntioncal acrylate is from 4/1 to 1/1.

17. A process as in claim 10, wherein said binder is a three-component system comprising (1) a vinyl chloride-vinyl acetate type copolymer or a cellulose resin, (2) a urethane resin, and (3) a polyisocyanate.

18. A process as in claim 17, wherein the magnetic layer is heated to a temperature of from 40° to 100° C. for curing when the magnetic layer is separated from the roller or band having a mirror surface.

19. A process as in claim 1, wherein the weight ratio of ferromagnetic powder to binder in the magnetic coating composition is from 2/1 to 6/1.

20. A process as in claim 10, wherein the weight ratio of ferromagnetic powder to binder in the magnetic coating composition is from 2/1 to 6/1.

21. A process as in claim 1, wherein the weight ratio of organic solvent to binder in the magnetic coating composition is from 6/1 to 15/1.

22. A process as in claim 10, wherein the weight ratio of organic solvent to binder in the magnetic coating composition is from 6/1 to 15/1.

23. A process as in claim 1, wherein the magnetic layer is dried so as to have a solvent content of from 0.5 to 8% by weight.

24. A process as in claim 1, wherein the magnetic layer is dried so as to have a solvent content of from 1.5 to 5% by weight.

25. A process as in claim 10, wherein the magnetic layer is dried so as to have a solvent content of from 0.5 to 8% by weight.

26. A process as in claim 10, wherein the magnetic layer is dried so as to have a solvent content of from 1.5 to 5% by weight.

* * * * *